United States Patent
Seong et al.

(10) Patent No.: US 10,899,244 B2
(45) Date of Patent: Jan. 26, 2021

(54) CHARGING CONTROL METHOD WITH USE OF A POWER FACTOR CORRECTION CIRCUIT AND SYSTEM FOR ELECTRIC VEHICLE

(71) Applicants: Hyundai Motor Company, Seoul (KR); Kia Motors Corporation, Seoul (KR)

(72) Inventors: Hyun Wook Seong, Gyeonggi-do (KR); Hui Sung Jang, Gyeonggi-do (KR); Shin Hye Chun, Jeollanam-do (KR); Mu Shin Kwak, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 401 days.

(21) Appl. No.: 15/625,890

(22) Filed: Jun. 16, 2017

(65) Prior Publication Data
US 2017/0368952 A1 Dec. 28, 2017

(30) Foreign Application Priority Data

Jun. 28, 2016 (KR) .......................... 10-2016-0080844

(51) Int. Cl.
*B60L 53/20* (2019.01)
*H02J 7/02* (2016.01)
(Continued)

(52) U.S. Cl.
CPC .............. *B60L 53/20* (2019.02); *H02J 7/007* (2013.01); *H02J 7/0029* (2013.01); *H02J 7/02* (2013.01);
(Continued)

(58) Field of Classification Search
USPC ........................................................ 320/140
See application file for complete search history.

(56) References Cited

U.S. PATENT DOCUMENTS 9,242,567 B2 * 1/2016 Kim ..................... B60L 11/1811
9,882,466 B2 * 1/2018 Kondo .................. H02M 3/155
(Continued)

FOREIGN PATENT DOCUMENTS

EP 2340961 A2 7/2011
EP 3007315 A1 4/2016
(Continued)

OTHER PUBLICATIONS

Anirban Ghoshal and Vinod John, Anti-windup Schemes for Proportional Integral and Proportional Resonant Controller, 2010, pp. 1-6 (Year: 2010).*
(Continued)

*Primary Examiner* — David V Henze-Gongola
*Assistant Examiner* — Tarikh Kanem Rankine
(74) *Attorney, Agent, or Firm* — Mintz Levin Cohn Ferris Glovsky and Popeo, P.C.; Peter F. Corless (57) ABSTRACT

A charging control method for an electric vehicle is provided. The method uses a vehicle charging device that includes a power factor correction circuit (PFC) and a DC/DC converter. The method includes receiving, by a PFC controller, a control pilot (CP) signal from an external charging device and restricting by the PFC controller an allowable current value derived by analyzing the CP signal to a maximum current value that is to be applied to the PFC. The PFC controller then derives an output current command value of the DC/DC converter by applying an output value of a voltage controller of the PFC to the allowable current value. A DC/DC converter controller then charges a battery using the output current command value of the DC/DC converter.

8 Claims, 4 Drawing Sheets

(51) Int. Cl.
  *H02J 7/00* (2006.01)
  *H02M 1/42* (2007.01)
  *B60L 53/30* (2019.01)
  *B60L 58/20* (2019.01)
  *B60L 53/22* (2019.01)
  *B60L 53/14* (2019.01)

(52) U.S. Cl.
  CPC .............. *H02M 1/42* (2013.01); *B60L 53/14* (2019.02); *B60L 53/22* (2019.02); *B60L 53/30* (2019.02); *B60L 58/20* (2019.02); *B60L 2210/10* (2013.01)

(56) References Cited

U.S. PATENT DOCUMENTS

| | | | |
|---|---|---|---|
| 9,887,579 B2* | 2/2018 | Berard | H02M 1/00 |
| 2005/0269974 A1* | 12/2005 | Ravindra | H05B 41/28 |
| | | | 315/308 |
| 2009/0103341 A1 | 4/2009 | Lee et al. | |
| 2009/0306914 A1* | 12/2009 | Cohen | G01R 21/06 |
| | | | 702/60 |
| 2010/0141037 A1* | 6/2010 | Joo | H02M 1/36 |
| | | | 307/64 |
| 2011/0156643 A1 | 6/2011 | Chen et al. | |
| 2012/0126742 A1* | 5/2012 | Reggio | H02M 3/33515 |
| | | | 320/104 |
| 2012/0217923 A1* | 8/2012 | Wu | H02P 21/0003 |
| | | | 318/610 |
| 2013/0009603 A1* | 1/2013 | Okui | H02J 3/24 |
| | | | 320/129 |
| 2013/0016531 A1* | 1/2013 | Aso | H02M 1/4225 |
| | | | 363/16 |
| 2013/0249469 A1* | 9/2013 | Pahlevaninezhad | H02J 7/022 |
| | | | 320/107 |
| 2013/0257146 A1 | 10/2013 | Nojima et al. | |
| 2013/0307489 A1* | 11/2013 | Kusch | B60L 11/1868 |
| | | | 320/162 |
| 2014/0049219 A1 | 2/2014 | Lee et al. | |
| 2014/0376289 A1* | 12/2014 | Bixel | H02M 1/42 |
| | | | 363/71 |
| 2015/0069953 A1 | 3/2015 | Seong et al. | |
| 2015/0102674 A1* | 4/2015 | Rudolph | H02J 3/381 |
| | | | 307/52 |
| 2015/0175020 A1 | 6/2015 | Kim et al. | |
| 2015/0349560 A1 | 12/2015 | Seong et al. | |
| 2017/0117810 A1* | 4/2017 | Ghosh | H02M 1/4225 |
| 2017/0203656 A1* | 7/2017 | Okamoto | B60L 11/182 |
| 2018/0050597 A1* | 2/2018 | Hand | B60L 15/007 |

FOREIGN PATENT DOCUMENTS

| | | |
|---|---|---|
| JP | 2012-244723 A | 12/2012 |
| JP | 2012-249409 A | 12/2012 |
| JP | 2013-099078 A | 5/2013 |
| JP | 2013-219867 A | 10/2013 |
| KR | 2009-0126196 A | 12/2009 |
| KR | 10-2012-0102308 A | 9/2012 |
| KR | 10-2015-0023997 A | 3/2015 |
| KR | 10-1567222 B1 | 11/2015 |
| KR | 10-2015-0137343 A | 12/2015 |
| WO | 2014/205452 A1 | 12/2014 |
| WO | 2015/071842 A1 | 5/2015 |
| WO | WO-2015152920 A1 * | 10/2015 ........ H02M 1/4225 |

OTHER PUBLICATIONS

Extended European Search Report for European Patent Application No. 17177102.5, dated Dec. 7, 2017, 11 pages.

* cited by examiner

CHARGING CONTROL METHOD WITH USE OF A POWER FACTOR CORRECTION CIRCUIT AND SYSTEM FOR ELECTRIC VEHICLE

CROSS REFERENCE TO RELATED APPLICATION

The present application claims priority to Korean Patent Application No. 10-2016-0080844, filed Jun. 28, 2016, the entire contents of which is incorporated herein for all purposes by this reference.

BACKGROUND

Field of the Invention

The present invention relates to charging control method and system for an electric vehicle and, more particularly, to charging control method and system for an electric vehicle in which a failure due to an overcurrent is prevented and battery charging efficiency of the vehicle is improved.

Description of the Related Art

Recently, there has been growing interest in electric vehicles due to development of environmentally friendly technologies. Accordingly, electric vehicles are actively being researched. Electric vehicles are driven by a motor that uses a high voltage battery. Thus, a driver may operate the vehicle without concerns about environmental pollution when electricity is provided to charge the battery.

Accordingly, charging methods for high voltage batteries that drive motors of electric vehicles are actively being studied. Charging methods for those batteries may be divided into two types. One method is a fast charging method in which the battery is charged in a charging station of an electric vehicle, and the other method is a standard charging method in which the battery is charged by using commercial power (e.g., 220V or 110V) as ordinarily used in homes.

For the standard charging method, the battery is charged by an on-board-charger (OBC) mounted within the vehicle, but it is problematic in that when overcurrent intended to charge the battery more rapidly is applied, an external vehicle charger of the vehicle is shut down.

A related art discloses a technique in which an allowable current of a charging device is limited to solve a shut-down problem of the charging device when multiple vehicles are charged at the same time using a single charging device.

However, the above method only prevents an excessive flow of current for other vehicles when a charging of one vehicle among the multiple vehicles is shut down, and does not provide a method for preventing a current flow that exceeds the allowable current value when charging the vehicle. Therefore, a current applied to the external charging device should be limited to be equal to or less than the allowable current value to thus prevent shut-down even if only one vehicle is charged. At the same time, a charging current value of the high voltage battery may be as high as possible within a charging allowable current such that charging efficiency of the battery is improved.

The foregoing is intended merely to aid in the understanding of the background of the present invention, and is not intended to mean that the present invention falls within the purview of the related art that is already known to those skilled in the art.

SUMMARY

Accordingly, the present invention provides a charging control method and system for an electric vehicle in which a failure of an external charging device is prevented, and, at the same time, charging efficiency of a battery is improved by limiting a charging current value used for charging the battery.

According to one aspect of the present invention, a charging control method for an electric vehicle is provided in which the method uses a vehicle charging device including a power factor correction circuit (PFC) and a direct current-direct current (DC/DC) converter. The method may include receiving, by a PFC controller, a control pilot (CP) signal from an external charging device; restricting, by the PFC controller, an allowable current value derived by analyzing the CP signal to a maximum current value that is to be applied to the PFC; deriving, by the PFC controller, an output current command value of the DC/DC converter by applying an output value of a voltage controller of the PFC to the allowable current value; and charging, by a DC/DC converter controller, a battery using the output current command value of the DC/DC converter.

The deriving of the output current command value of the DC/DC converter may include: applying, by the PFC controller, the allowable current value and the output value of the voltage controller of the PFC to a proportional-integral (PI) controller; and deriving, by the PFC controller, the output current command value of the DC/DC converter by dividing an output value of the PI controller by an output voltage value of the DC/DC converter.

When applying the allowable current value and the output value of the voltage controller to the PI controller, the PFC controller may be configured to add a preset input margin value to the allowable current value and apply an additional result value to the PI controller. The PFC controller may further be configured to add the preset input margin value to the allowable current value after filtering the preset input margin value to remove an overshoot thereof. When deriving the output current command value of the DC/DC converter, the PFC controller may be configured to derive the output current command value of the DC/DC converter by applying the allowable current value and the output value of the voltage controller of the PFC to a PI controller.

After restricting the allowable current value to the maximum current value that is to be applied to the PFC, when an elapsed time after the PFC controller has received the CP signal from the external charging device is equal to or less than reference time, the method may further include: deriving, by the PFC controller, an input power value by multiplying the current value and a voltage value applied to the PFC; deriving, by the PFC controller, an output power value by multiplying the input power value and a preset efficiency value; and deriving, by the PFC controller, the output current command value of the DC/DC converter by dividing the output power value by the output voltage value of the DC/DC converter.

The charging of the battery may include: applying, by the DC/DC converter controller, the output current command value of the DC/DC converter and an output current value of the DC/DC converter to a current controller; and charging, by the DC/DC converter controller, the battery by operating the DC/DC converter through a duty ratio output from the current controller.

A charging control system for an electric vehicle according to the present invention may include: a battery capable of being charged and discharged; an external charging device configured to provide charging power to the battery; a PFC configured to compensate for a power factor of AC power applied to a vehicle charging device; a DC/DC converter connected to the PFC and configured to convert an output voltage of the PFC to a charging voltage of the battery; a PFC controller configured to receive a control pilot (CP) signal from the external charging device, restrict an allowable current value derived by analyzing the CP signal to a maximum current value to be applied to the PFC from the external charging device, and derive an output current command value of the DC/DC converter by applying an output value of a voltage controller of the PFC to the allowable current value; and a DC/DC converter controller configured to charge the battery using the output current command value of the DC/DC converter.

The PFC controller may further be configured to derive the output current command value of the DC/DC converter by applying the allowable current value and the output value of the voltage controller of the PFC to a PI controller and by dividing an output value of the PI controller by an output voltage value of the DC/DC converter. When the elapsed time after the PFC controller has received the CP signal from the external charging device is equal to or less than reference time, the PFC controller may be configured to derive an input power value by multiplying the current value and a voltage value applied to the PFC, derive an output power value by multiplying the input power value and a preset efficiency value, and derive the output current command value of the DC/DC converter by dividing the output power value by the output voltage of the DC/DC converter.

The following effects may be obtained using the above method and system.

First, shut-down of an external charging device due to an overcurrent is prevented by restricting an input current value that is input to a vehicle charging device to a maximum allowable current value of the external charging device.

Second, charging time may be reduced as long as the external charging device is not shut down since an output current value used for charging a battery of the vehicle charging device is set close to the maximum allowable current value.

Third, stable charging control of an electric vehicle is achieved by connecting various logics, which are used to derive an output current value for charging the battery, in parallel according to response time of each logic and maximizing unique benefits of each logic.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about"

Hereinbelow, exemplary embodiments of the present invention will be described in detail with reference to the accompanying drawings.

Figure 1:
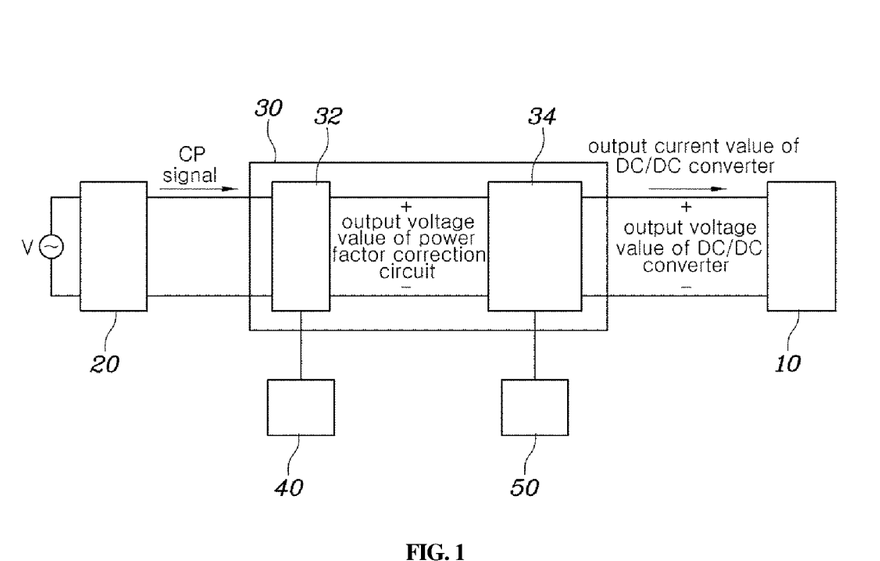
FIG. 1 is a configuration diagram of a charging system for an electric vehicle according to an exemplary embodiment of the present invention.

Before describing a charging control method according to an exemplary embodiment of the present invention, a charging system in which the charging control method may be applied is shown in FIG. 1. As shown in FIG. 1, an external charging device 20 may be connected to a commercial power (e.g., domestic AC 220V), the external charging device 20 may be connected to a vehicle charging device 30 that includes a power ratio correction circuit 32 and a DC/DC converter 34, and an output terminal of the vehicle charging device 30 may be connected to a battery 10.

Herein, the external charging device 20 is referred to as a device that is used when a vehicle is charged by a standard charging method using commercial power. In general, electric vehicle service equipment (EVSE) or in cable control box (ICCB) is used as the external charging device 20.

As shown in FIG. 1, the power factor correction circuit (PFC) 32 may be disposed in the front end of the vehicle charging device 30 such that the PFC 32 is connected to the external charging device 20. The DC/DC converter 34 may be disposed in the rear end of the vehicle charging device 30 such that the DC/DC converter 34 is connected to the battery 10. Additionally, a PFC controller 40 and a DC/DC converter controller 50 are controllers configured to operate each of the PFC 32 and a DC/DC converter 34, respectively, and operate switching elements of the PFC 32 and a DC/DC converter 34 using current values and voltage values that are input/output to/from the PFC 32 and a DC/DC converter 34.

Figure 2:
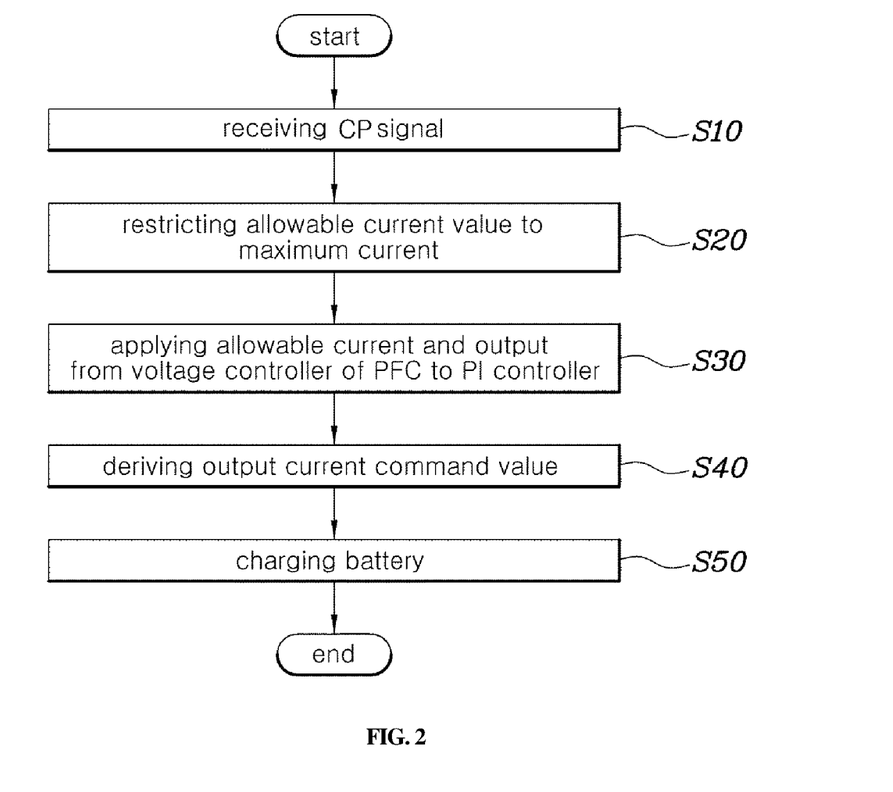
FIG. 2 is a flowchart of a charging control method for an electric vehicle according to an exemplary embodiment of the present invention.

Assuming that the system in which the charging control method according to the exemplary embodiment of the present invention is configured as FIG. 1, the charging control method according to the exemplary embodiment of the present invention is described below in detail. As shown in FIG. 2, the PFC controller 40 may be configured to receive a control pilot (CP) signal from the external charging device 20 (S10). The PFC controller 40 may then be configured to restrict an allowable current value derived by analyzing the CP signal to a maximum current value that is to be applied to the PFC 32 from the external charging device 20 (S20).

To prevent a shut-down of the external charging device 20, the maximum current value to be applied to the PFC 32 is limited as to the S20 in the present invention. The external charging device 20 is shut down when a current value applied to the vehicle charging device 30 from the external charging device 20 exceeds an allowable current value, which corresponds to a limiting current of the external charging device 20. Therefore, such factors may be considered before applying a current to the vehicle charging device 30 from the charging device 20. Accordingly, the CP signal may be received from the external charging device 20 (S10) and the maximum current value to be applied to the PFC 32 may be limited (S20).

Herein, the CP signal refers to a signal that is transmitted to the vehicle charging device 30 from the external charging device 20 for charging the vehicle. A variety of information such as an allowable current value and an input voltage of the external charging device 20 is included in the CP signal. Thus, the PFC controller 40 may be configured to analyze the received CP signal and derive the allowable current value from the signal, and restrict the maximum current value that is to be applied to the PFC 32 using the derived allowable current value.

Further, the PFC controller 40 may be configured to restrict the maximum current value to be applied to the PFC 32 by using various methods. As typical method, a limit block is used in which the allowable current value is used as a limiting value such that a current value applied to the vehicle charging device 30 from the external charging device 20 does not exceed the allowable current value. Therefore, by using the above method, the maximum current value to be applied to the vehicle charging device 30 from the external charging device 20 is not capable of exceeding the allowable current value, and a shut-down of the external charging device 20 may be prevented. However, battery charging efficiency may be reduced since the current value applied to the PFC 32 is reduced. Thus, the charging control method of the present invention is not finished by restricting the allowable current value to the maximum current value to be applied to the PFC 32 (S20), and a method for maximizing the charging efficiency of the battery 10 is provided by adding an additional control method.

Herein, the additional control method corresponds to steps after S20, wherein the PFC controller 40 may be configured to apply the allowable current value and an output value of a voltage controller of the PFC 32 to the proportional-integral (PI) controller (S30), and the PFC controller 40 may be configured to derive the output current command value of the DC/DC converter 34 by dividing an output value of the PI controller by an output voltage of the DC/DC converter 34 (S40).

Figure 3:
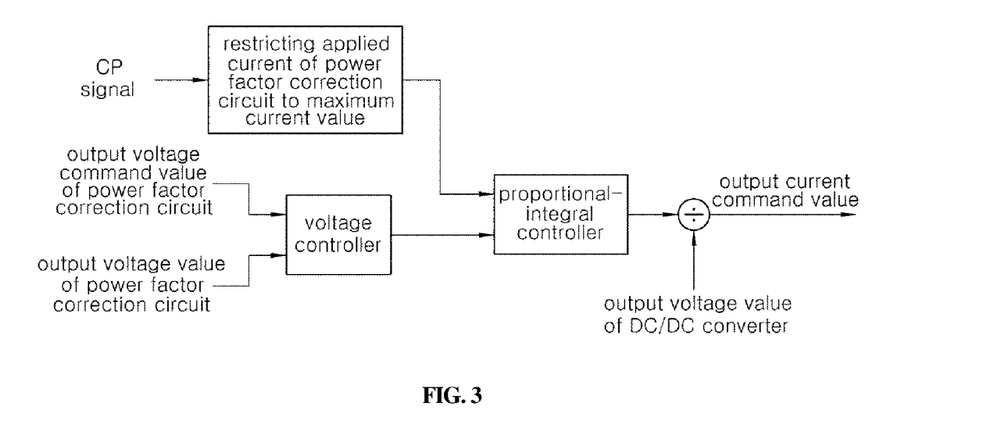
FIG. 3 is a flow diagram of deriving an output current command value according to an exemplary embodiment of the present invention.

The detailed flow diagram of the method is shown in the FIG. 3. In particular, as shown in FIG.

3, the PFC controller 40 may be configured to analyze the CP signal, derive and restrict the maximum current value to be applied to the PFC 32 (S20). The PFC controller 40 may be configured to apply the allowable current value and the output value of the voltage controller of the PFC 32 to the PI controller. Herein, various types of PI controllers may be used. A proportional integral (PI) controller having an anti-windup structure may be provided in the exemplary embodiment of the present invention. The PI controller has a feedback controller configuration, and may be configured to measure an output value of a target to be adjusted, calculate an error value by comparing with a desired preset value, and calculate a control value used for controlling using the error value.

An integrated value of the error may be accumulated to be a substantially large value, the output value may be about the preset value, and the control value may decrease. However, the control value continuously remains in a large value and takes time to reach to the preset value when the PI controller is saturated. Therefore, a PI controller having an anti-windup structure is used in the present invention such that the above situation is prevented and the output value is derived more stably.

In addition, as shown in FIG. 3, apart from the allowable current value, the output value of the voltage controller of the PFC 32 may also be applied to the PI controller. Herein, the voltage controller refers to a standard PI controller, and the PI controller described above may also be used. Although any type of voltage controller may be used, an output voltage command value of the PFC 32 and an output voltage value of the PFC 32 may be applied to the voltage controller. Herein, as described in FIG. 1, the output voltage command value of the PFC 32 indicates a voltage output in an output terminal of the PFC 32 of the vehicle charging device 30 and the output voltage value of the PFC 32 is a target output voltage value that is set by the PFC controller 40.

In view of the flowchart of FIG. 3, a value derived from the voltage controller or the PI controller may be different based on the configuration of the voltage controller and will be a current command value that is applied to the PFC 32. Additionally, an output power value of the vehicle charging device 30 may be derived by applying the current command value applied to the PFC 32 and the current value actually applied to the PFC 32 to the PI controller. Finally, the output current command value that corresponds to a current command value and is used for charging the battery 10 may be derived by dividing an output value of the PI controller by the output voltage value of the DC/DC converter 34 of FIG. 1.

The battery 10 may then be charged (S50) as shown in FIG. 2 after the output current command value is derived from the above method. The battery 10 may be charged (S50) by using various methods and utilizing the derived output current command value. In the present invention, a typical method is provided in which the DC/DC converter controller 50 may be configured to apply the output current command value and an output current value of the DC/DC converter 34 to a current controller and charge the battery 10 by operating the DC/DC converter 34 using a duty ratio output from the current controller. Herein, as the voltage controller of the PFC 32, controllers having various configurations including a PI controller may be used for the current controller. A shut-down of the external charging device 20 may be prevented and battery charging efficiency may be maximized when the electric vehicle is charged using the above methods.

A method of adding a preset input current margin value to the allowable current value of FIG. 3 may be considered. A gap may exist be between the allowable current value of the external charging device 20 and a current value that is actually applied to the PFC 32. Accordingly, due to the gap, the vehicle charging device 30 may not charge the battery 10 using maximum available output power. Therefore, a preset input current margin value may be added to the allowable current value. In addition, in the present invention, the input current margin value may be filtered to remove an overshoot thereof. Since a shut-down prevention effect of the external charging device 20, which is the original goal of the present invention, may be lost by adding the input current margin value, the filtered input current margin value may be added to the allowable current value. Current values and voltage values that are applied to the PFC 32 are alternating current (AC) signals rather than direct current (DC) signals, thus, an overshoot in which the current and voltage values momentary exceed rated amplitude values may occur.

Therefore, the overshoot may be removed by applying a filter to the input current margin value since a current value in which the input current margin value is added, which is applied to the PFC 32, may exceed the allowable current value due to the overshoot. A hardware filter using RLC elements may be used as the filter. However, a space is required for the hardware filter and a performance thereof may be insufficient, thus it may be preferable that the PFC controller 40 in which a software-based filter is included filters the overshoot of the input current margin value. Further, a method in which the input current command value may be directly derived by applying the allowable current value and the output value of the voltage controller of the PFC 32 to the PI controller may be considered.

In addition, the method may be varied according to the elapsed time after the PFC controller 40 has received the CP signal from the external charging device 20. An integral controller, for example an integral controller or a PI controller, may include reactance components and response time thereof is relatively slow. Thus, it is preferable to use the charging control method that uses the integral controller after time required for a normal response has elapsed. Therefore, in the present invention, a charging control method for an electric vehicle capable of being used when elapsed time after the PFC controller 40 has received the CP signal from the external charging device 20 is equal to or less than reference time is provided. In other words, the method may be used when time required for a normal response has not elapsed.

In particular, the PFC controller 40 may be configured to derive an input power value by multiplying the current and a voltage value that are applied to the PFC 32, derive an output power value by multiplying the input power value and a preset efficiency value, derive the output current command value of the DC/DC converter 34 by dividing the output power value by the output voltage of the DC/DC converter 34, and charge the battery 10 using the output current command value. Response time to derive the output current command value is not substantially required since the output current command value is derived by multiplying the preset efficiency value to the derived output power value. Therefore, it may be preferable to use the above method when a user requires a vehicle charging device 30 with a rapid response. However, there is a disadvantage that a battery charging efficiency of this method is less than that of the charging control method that uses the integral controller, but the charging efficiency may be compensated by properly adjusting the efficiency value.

Herein, the efficiency value is a value that may be determined according to a type of vehicle charging device 30. The efficiency value may be derived by applying a voltage in an input terminal and an output terminal of vehicle charging device 30 and comparing an input current and an output current of thereof. The efficiency value may differ based on the type of vehicle charging device 30, but the efficiency value may be within a range from about 0 to 1 since the output power value may not be greater than the input power value according to a low of energy conservation.

In addition, since the charging control method that uses the efficiency value increases in response to the late response of the charging control method that uses the integral controller, a combined method in which the two above methods are combined may be considered. In the combined method, the PFC controller 40 may be configured receive the CP signal from the external charging device 20, the PFC controller 40 may be configured to execute the charging control method that uses the efficiency value when the elapsed time after receiving the CP signal is equal to or less than the reference time and execute the charging control method that uses the integral controller when the elapsed time after receiving the CP signal exceeds or is greater than the reference time. Further, the reference time may correspond to a time required for the normal response of the integral controller. Thus, the reference time may be derived using a time constant of the integral controller.

Accordingly, an optimum output current command value for charging the battery 10 may be derived. An effect obtained by implementing the charging control method according to the present invention is confirmed in the FIG. 4 by comparing the current value applied to the PFC 32 and the output current value of the vehicle charging device 30 according to the present invention and the prior art.

Figure 4:
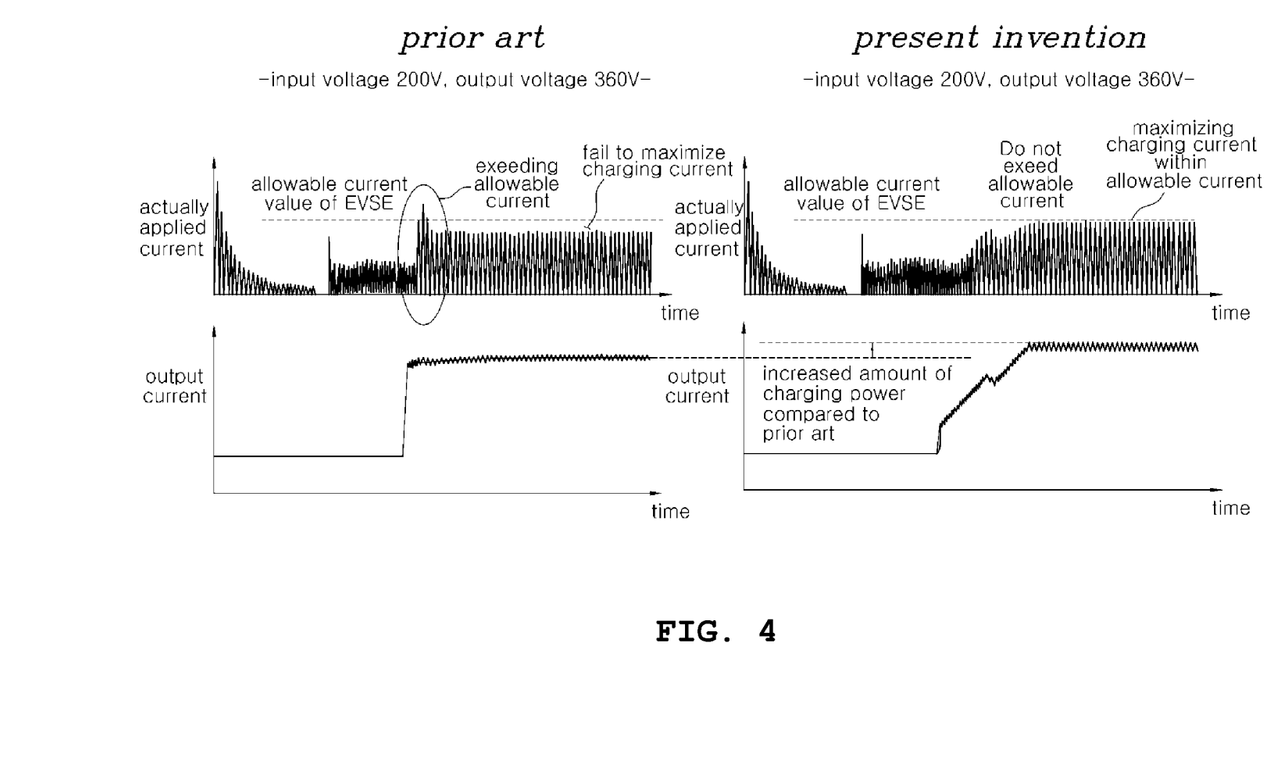
FIG. 4 is a graph in which effects of implementation of a charging control method between the art and the present invention are compared.

In particular, in FIG. 4, dotted or dashed lines indicate an EVSE allowable current value of actual input current graphs and refer to an allowable current value of the external charging device 20. In the prior art, an actual input current exceeded the EVSE allowable current value and this is indicated in a circle. Therefore, in the prior art, a shut-down of the EVSE, in other words, the external charging device 20 may occur. However, in the present invention, an actual input current value does not exceed the EVSE allowable current value, and thus, a shut-down of the external charging device 20 is prevented from occurring while charging the vehicle.

Further, FIG. 4 shows that an output current value of the present invention is increased compared to that of the prior art. The increased output current value reduces charging time of the battery 10 thus improving a charging efficiency of the battery 10. Therefore, a shut-down of the external charging device 20 may be prevented and charging efficiency of the battery 10 may be improved as shown in the FIG. 4.

In addition, as shown in FIG. 1, a charging control system according to an exemplary embodiment of the present invention may include: a battery 10 capable of being charged and discharged; an external charging device 20 configured to provide charging power to the battery 10; a PFC 32 configured to compensate a power factor of AC power applied to a vehicle charging device 30; a DC/DC converter 34 connected to the PFC 32 and configured to convert an output voltage of the PFC 32 to a charging voltage of the battery 10; a PFC controller 40 configured to receive a control pilot (CP) signal from the external charging device 20, restrict an allowable current value derived by analyzing the CP signal to a maximum current value applied to the PFC 32 from the external charging device 10, and derive an output current command value of the DC/DC converter 34 by applying an output value of a voltage controller of the PFC 32 to the allowable current; and a DC/DC converter controller 50 configured to charge the battery 10 using the output current command value of the DC/DC converter 34.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A charging control method for an electric vehicle, the method using a vehicle charging device including a power factor correction circuit (PFC), and a direct current/direct current (DC/DC) converter, the method comprising:
   receiving, by a PFC controller, a control pilot (CP) signal from an external charging device;
   restricting, by the PFC controller, an allowable current value derived by analyzing the CP signal to a maximum current value to be applied to the PFC;
   deriving, by the PFC controller, an output current command value of the DC/DC converter by applying an output value of a voltage controller of the PFC to the allowable current value; and
   charging, by a DC/DC converter controller, a battery using the output current command value of the DC/DC converter,
   wherein the deriving of the output current command value of the DC/DC converter includes:
      receiving, by a voltage controller of the PFC, an output voltage command value of the PFC circuit and an output voltage value of the PFC circuit,
      applying, by the PFC controller, the allowable current value and the output value of the voltage controller of the PFC to a proportional-integral (PI) controller; and
      deriving, by the PFC controller, the output current command value of the DC/DC converter by dividing an output value of the PI controller by an output voltage value of the DC/DC converter.

2. The method of claim 1, wherein, when applying the allowable current value and the output value of the voltage controller to the PI controller, the PFC controller is configured to add a preset input margin value to the allowable current value and apply an additional result value to the PI controller.

3. The method of claim 2, wherein the PFC controller is configured to add the preset input margin value to the allowable current value after filtering the preset input margin value to remove an overshoot thereof.

4. The method of claim 1, wherein, after restricting the allowable current value to the maximum current value to be applied to the PFC, when an elapsed time after the PFC controller has received the CP signal from the external charging device is equal to or less than reference time, the method further includes:
   deriving, by the PFC controller, an input power value by multiplying the current value and a voltage value applied to the PFC;
   deriving, by the PFC controller, an output power value by multiplying the input power value and a preset efficiency value; and
   deriving, by the PFC controller, the output current command value of the DC/DC converter by dividing the output power value by the output voltage value of the DC/DC converter.

5. The method of claim 1, wherein charging the battery includes:
   applying, by the DC/DC converter controller, the output current command value of the DC/DC converter and an output current value of the DC/DC converter to a current controller; and
   charging, by the DC/DC converter controller, the battery by operating the DC/DC converter using a duty ratio output from the current controller.

6. A charging control system for an electric vehicle, comprising:
   a battery capable of being charged and discharged;
   an external charging device configured to provide charging power to the battery;
   a power factor correction circuit (PFC) configured to compensate for a power factor of alternating current (AC) power applied to a vehicle charging device;
   a direct current/direct current (DC/DC) converter connected to the PFC and configured to convert an output voltage of the PFC to a charging voltage of the battery;
   a PFC controller configured to receive a control pilot (CP) signal from the external charging device, restrict an allowable current value derived by analyzing the CP signal to a maximum current value to be applied to the PFC from the external charging device, and derive an output current command value of the DC/DC converter by applying an output value of a voltage controller of the PFC to the allowable current value; and
   a DC/DC converter controller configured to charge the battery using the output current command value of the DC/DC converter,
   wherein the PFC controller is configured to derive the output current command value of the DC/DC converter by applying the allowable current value and the output value of the voltage controller of the PFC to a proportional-integral (PI) controller and by dividing an output value of the PI controller by an output voltage value of the DC/DC converter, and
   wherein the voltage controller is configured to receive an output voltage command value of the PFC circuit and an output voltage value of the PFC circuit.

7. The system of claim 6, wherein, when an elapsed time after the PFC controller has received the CP signal from the external charging device is equal to or less than reference time, the PFC controller is configured to derive an input power value by multiplying the current value and a voltage value applied to the PFC, derive an output power value by multiplying the input power value and a preset efficiency value, and derive the output current command value of the DC/DC converter by dividing the output power value by the output voltage of the DC/DC converter.

8. The system of claim 6, wherein the proportional-integral (PI) controller has anti-windup structure.

* * * * *